ALEXANDER RODGERS.
Improvement in Machines for Turning Logs in Saw Mills.
No. 124,763.  Patented March 19, 1872.

Witnesses:
A Benneinendorf.
Francis McArdle

Inventor:
Alexander Rodgers
Per Munn & Co.
Attorneys.

124,763

UNITED STATES PATENT OFFICE.

ALEXANDER RODGERS, OF MUSKEGON, MICHIGAN.

IMPROVEMENT IN MACHINES FOR TURNING LOGS IN SAW-MILLS.

Specification forming part of Letters Patent No. 124,763, dated March 19, 1872.

*To all whom it may concern:*

Be it known that I, ALEXANDER RODGERS, of Muskegon, in the county of Muskegon and State of Michigan, have invented a new and useful Improvement in a Device for Turning Logs in Saw-Mills; and I do hereby declare that the following is a full, clear, and exact description thereof, which will enable others skilled in the art to make and use the same, reference being had to the accompanying drawing forming part of this specification, in which—

Figure 1:
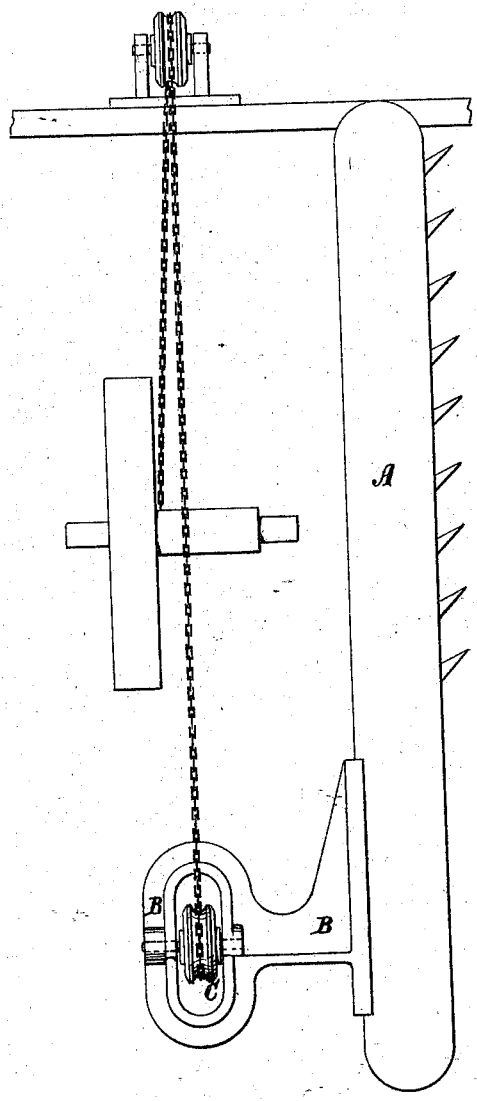
Figure 2:
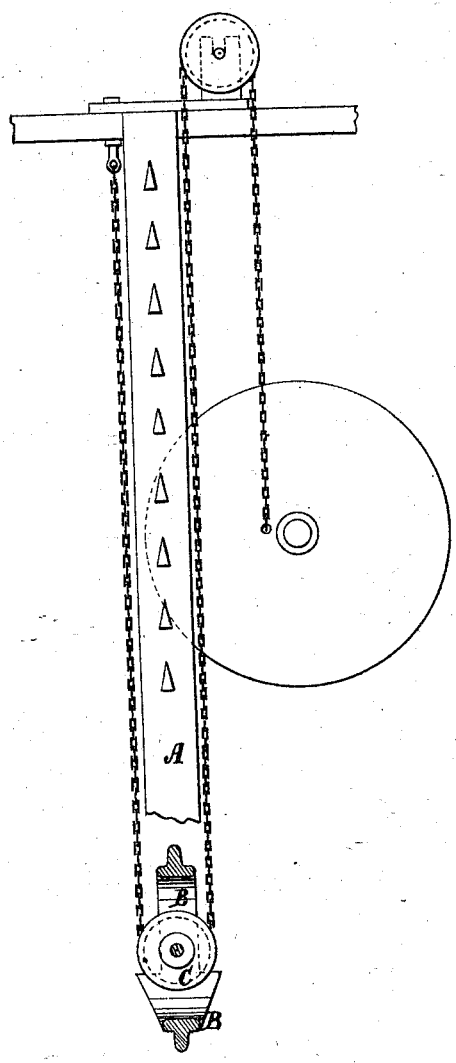

Figure 1 is a side view of a log-turning device illustrating my improvement. Fig. 2 is a front view of the same, part being broken away to show the construction.

Similar letters of reference indicate corresponding parts.

My invention has for its object to improve the construction of E. Tarrant's machine for turning logs in saw-mills, patented August 25, 1868, and numbered 81,432, so as to make it more convenient in use, and more effective in operation, requiring less power to operate it, and enabling a smaller chain to be used; and it consists in the sheave, in combination with the arm of the toothed bar, to receive the chain, as hereinafter more fully described.

A is the toothed bar, by which the log is turned or rolled, about the construction of which there is nothing new. To the rear side of the lower end of the bar A is rigidly and securely attached an arm, B, having a sheave, C, pivoted in a recess in its outer end. The chain, instead of being attached to the arm B, as described in patent number 81,432, is passed around the sheave C, and its end is attached to the frame-work of the machine above the arm B. The other end of the chain is passed over a pulley attached to the frame-work of the machine above the arm B, as shown in patent number 81,432, and is attached to the shaft or drum of the friction-pulley.

By this construction the strain upon the chain is distributed upon its two parts, so that the chain may be made lighter, and at the same time the friction-pulley may be made smaller, thus giving greater speed to the device.

Having thus described my invention, I claim as new and desire to secure by Letters Patent—

The combination of a sheave, C, with the arm B attached to the lower part of the rear side of the toothed bar A, to receive the chain, substantially as herein shown and described, and for the purpose set forth.

ALEX. RODGERS.

Witnesses:
DAVID McLAUGHLIN,
LIBBIE WARNER.